United States Patent
Schruefer et al.

(10) Patent No.: US 6,517,078 B2
(45) Date of Patent: Feb. 11, 2003

(54) FACE SEAL DEVICE WITH ADDITIONAL MASS FOR HIGH ROTATIONAL SPEEDS

(75) Inventors: Andreas Schruefer, Wolfratshausen (DE); Werner Wolf, Mammendorf (DE); Guenther Lederer, Geretsried (DE); Peter Droescher, Wolfratshausen (DE); Josef Nosowicz, Geretsried (DE); Georg Steigenberger, Muensing (DE)

(73) Assignee: Burgmann Dichtungswerke GmbH and Co. KG, Wolfratshausen (DE)

( * ) Notice: Subject to any disclaimer, the term of this patent is extended or adjusted under 35 U.S.C. 154(b) by 0 days.

(21) Appl. No.: 09/990,266

(22) Filed: Nov. 23, 2001

(65) Prior Publication Data

US 2002/0060429 A1 May 23, 2002

(30) Foreign Application Priority Data

Nov. 23, 2000 (DE) .......................................... 200 19 879

(51) Int. Cl.⁷ ................................................ F16J 15/16
(52) U.S. Cl. ........................ 277/398; 277/358; 277/377; 277/379; 277/382; 277/386
(58) Field of Search ................................ 277/377, 398, 277/379, 358, 382, 386

(56) References Cited

U.S. PATENT DOCUMENTS

| | | | | |
|---|---|---|---|---|
| 4,407,512 A | * | 10/1983 | Trytek | 277/400 |
| 4,643,437 A | * | 2/1987 | Salant et al. | 277/319 |
| 4,890,851 A | | 1/1990 | Avard et al. | 277/89 |
| 5,039,113 A | * | 8/1991 | Gardner | 277/379 |
| 5,435,574 A | * | 7/1995 | Victor et al. | 277/379 |
| 5,490,679 A | * | 2/1996 | Borrino et al. | 277/369 |
| 5,538,257 A | * | 7/1996 | Sandgren | 277/379 |
| 5,681,047 A | * | 10/1997 | Klostermann et al. | 277/400 |
| 6,425,583 B1 | * | 7/2002 | Muraki | 277/358 |

FOREIGN PATENT DOCUMENTS

| | | | | |
|---|---|---|---|---|
| DE | 35 41 283 A1 | 3/1987 | | F16J/15/34 |
| JP | 56-94067 A | 7/1981 | | F16J/15/34 |

* cited by examiner

*Primary Examiner*—Anthony Knight
*Assistant Examiner*—Christopher Boswell
(74) *Attorney, Agent, or Firm*—Sughrue Mion, PLLC

(57) ABSTRACT

A face seal device for use with components rotating at a high rotational speed includes a non-rotating face seal ring (5) and a rotary face seal ring (11). The rotary face seal ring is mounted in a loose fit for common rotation with a rotating component and includes a sealing face (6) which, in operation, is essentially radially aligned for cooperation with an opposite sealing face (16) of the non-rotating face seal ring. A heavy-mass-contributing element (22) is arranged to rotate in common with the rotating component and engages a portion of the rotary face seal ring. The center of gravity of the heavy-mass-contributing element is axially spaced from that of the rotary face seal ring, whereby, in operation, a torque directed towards the non-rotating face seal ring is applied to the rotary face seal ring. This torque arises from the centrifugal forces that correspond to the mass-contributing element and the spacing between the centers of gravity.

15 Claims, 1 Drawing Sheet

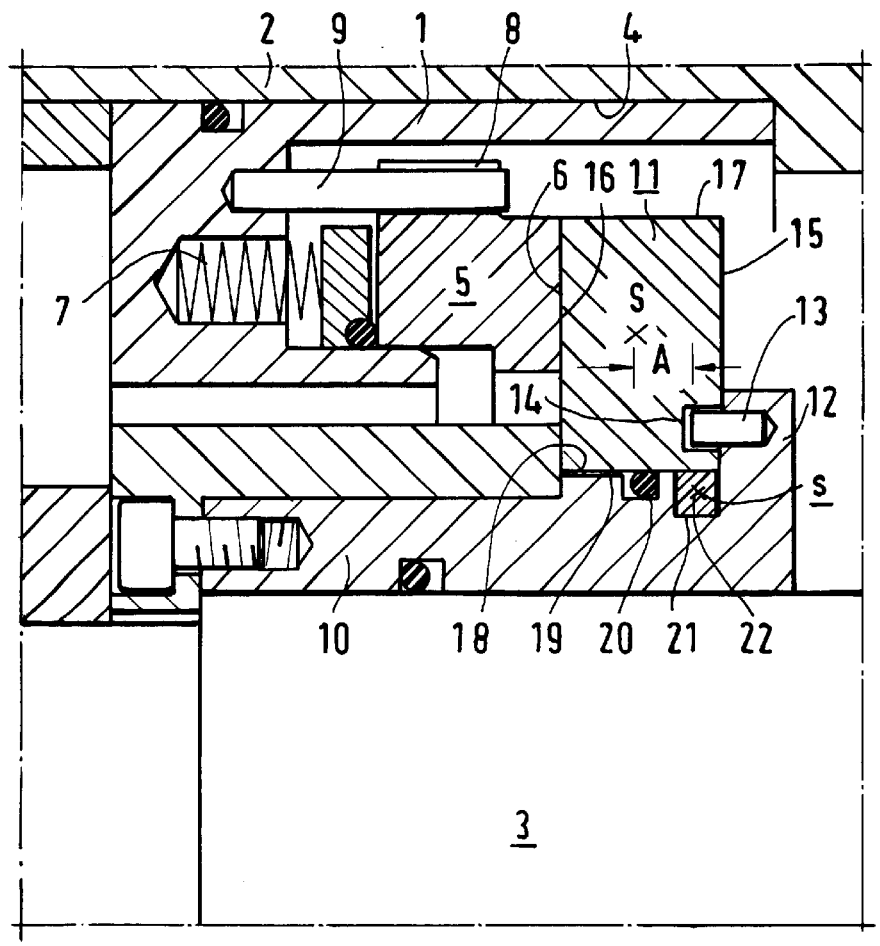
FIG.1
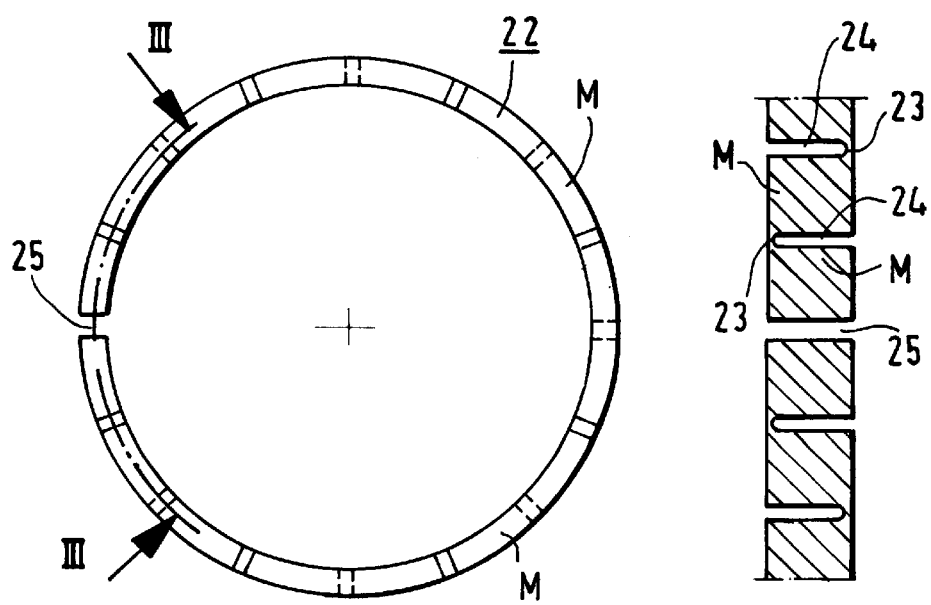
FIG.2
FIG.3

FACE SEAL DEVICE WITH ADDITIONAL MASS FOR HIGH ROTATIONAL SPEEDS

The following disclosure is based on German Utility Model Application No. 200 19 879.3, filed on Nov. 23, 2000, which is incorporated into this application by reference.

FIELD OF AND BACKGROUND OF THE INVENTION

The invention relates to a face seal device having a supplemental mass, for use with components rotating at a high rotational speed.

The invention relates, in particular, to a face seal device which is not only suitable for use at high rotational speeds but which is especially suitable likewise for sealing high pressures. In applications of this type, it is preferred that ceramic materials be used for the rotary face seal ring because of the high wear-resistance properties of these materials. At high rotational speeds, despite the fundamentally high resistance of ceramic materials such as silicon carbide (SiC) or sintered materials such as tungsten carbide (WC) to thermal distortions, and despite of lack of direct contact between the face seal rings, the face seal ring may experience a heating due to friction with the gaseous or liquid medium in the sealing clearance (molecular friction) to such an extent as to lead to intolerable thermally induced distortions or deformations of the rotary face seal ring, whence the geometry of the sealing clearance could be adversely affected. In particular, the sealing clearance may open in the manner of a wedge (the formation of a so-called V-gap) thereby resulting in considerably increased leakages.

OBJECTS OF THE INVENTION

One object of the invention is to provide an improved face seal device suitable for high rotational speeds while having minimized leakage. A further, more particular object of the invention is to provide a face seal device in which detrimental effects in regard to the geometry of the sealing clearance between co-operating face seal rings caused by thermally induced distortions of a rotary face seal ring can be either entirely prevented or prevented to the best extent possible.

SUMMARY OF THE INVENTION

These and other objects are achieved in accordance with the present invention by a face seal device for use with components rotating at a high rotational speed. According to one formulation of the invention, such a face seal device includes a non-rotating face seal ring and a rotary face seal ring. The rotary face seal ring is mounted in a loose fit for common rotation with a rotating component and includes a sealing face which, in operation, is essentially radially aligned for cooperation with an opposite sealing face of the non-rotating face seal ring. A mass-contributing element, preferably relatively heavy, is arranged to rotate in common with the rotating component and engages a portion of the rotary face seal ring. The center of gravity of the mass-contributing element is axially spaced from that of the rotary face seal ring, whereby a torque directed towards the non-rotating face seal ring is exerted to the rotary face seal ring in correspondence with the centrifugal forces arising due to the mass-contributing element and the spacing between the centers of gravity.

A thermally induced deformation of the rotary face seal ring is thereby effectively countered and a compensating effect for a change in the geometry of the sealing clearance caused by such a deformation is thus obtained. As a result, the desired geometry of the sealing clearance will be maintained even when the rotary face seal ring is used at high to very high rotational speeds.

The preferred rectangular form of the cross-sectional configuration of the rotary face seal ring can be retained with the invention. This is beneficial, since this form has proved to be advantageous both in regard to the operational behavior, production and mounting of the face seal ring as well as to the replacement of worn face seal rings. In order to ensure a uniform distribution of the centrifugal forces around the periphery of the rotary face seal ring, it is preferred, according to an embodiment of the invention, that the mass-contributing element be composed of a plurality of peripherally distributed individual masses, in which the individual masses may be mutually discrete or connected to one another in articulated manner.

BRIEF DESCRIPTION OF THE DRAWINGS

The invention as well as embodiments and advantages thereof are described below in greater detail, by way of example, with reference to the drawings in which:

FIG. 1 is a longitudinally sectioned view of a face seal device according to a preferred embodiment of the invention, installed in an equipment requiring sealing;

FIG. 2 is a scaled-down side view of an articulated ring comprising a plurality of individual masses; and FIG. 3 is a sectional view along the sectional line III—III in FIG. 2.

DETAILED DESCRIPTION OF THE PREFERRED EMBODIMENTS

The invention will be explained in more detail hereinafter with the aid of a preferred embodiment thereof shown in the drawings. In FIG. 1, a seal casing for a face seal device according to the present invention bears the reference 1 and can be secured in a boring 4 of a housing 2 (only shown in a fragmentary manner in the drawing) of an equipment e.g. a compressor. A shaft 3, e.g. the shaft of a compressor impeller, extends through the boring 4 to the exterior. A rotationally stationary face seal ring 5 is mounted axially moveably in the seal casing 1 for cooperation with a rotary face seal ring 11. Provision is made for a biasing element, e.g. in the form of a biasing spring 7 or a plurality of peripherally distributed biasing springs which are supported at one end on the stationary face seal ring 5 and on the seal casing 1 at the other end thereof, in order to produce a bias force for urging the stationary face seal ring 5 against the rotary face seal ring 11. The stationary face seal ring 5 is held such that it cannot rotate relative to the seal casing 1. Although other mechanisms could be provided for this purpose, the present embodiment uses a dog-pin 9 which projects axially from the seal casing 1 and engages in an axial recess 8 in the stationary face seal ring 5 such as to prevent the rotation thereof.

A sleeve 10 is suitably mounted on the shaft 3 for common rotation therewith. The rotary face seal ring 11 is mounted on the sleeve 10 in a loose fit and is caused to rotate therewith by means of a drive-pin 13 projecting axially from a flange-like end portion 12 of the sleeve 10 and engaging in a boring 14 which is formed in an end face 15 of the rotary face seal ring 11 facing the flange-like end portion 12. The dimensions of the drive-pin 13 and the boring 14 are such that, although they will enable torque to be transferred between the sleeve 10 and the rotary face seal ring 11, there will be sufficient free-play between the parts as to allow the rotary face seal ring 11 to be mounted on the sleeve 10 merely as a loose fit.

As shown, the flange-like end portion 12 of the sleeve 10 overlaps only a small radial surface portion of the adjacent end face 15 of the rotary face seal ring 11 so that the rear part thereof is held in such a way that it is essentially free of support.

The mutually facing end faces of the face seal rings 5, 11 form essentially radially aligned sealing faces 6, 16 between which, in operation, a sealing clearance is produced, which separates the sealing faces 6, 16 so that they do not touch one another. By contrast, the sealing faces 6, 16 are pressed together in sealing engagement by the bias force of the spring 7 when the shaft 3 is stationary so as to prevent a medium being sealed from leaking along the region between the sealing faces 6, 16 when in the stationary state. If so desired, pumping structures may be formed in one of the sealing faces 6, 16 so as to pump the medium between the sealing faces and thereby assist the formation of the sealing clearance. Pumping structures of this type are known to a person skilled in the art and thus do not need to be described here in detail.

As shown, the rotary face seal ring 11 preferably, although this is not obligatory, has an essentially rectangular cross-section having inner and outer peripheral surfaces 17, 18. The inner peripheral surface 18 of the rotary face seal ring 11 is mounted in a loose fit on an outer radially projecting peripheral surface portion 19 of the sleeve 10. Provision is made for a secondary seal, e.g. in the form of an O-ring 20, which is inserted in an annular groove in the outer peripheral surface portion 19 of the sleeve 10 so as to produce a sealing connection between the peripheral surfaces 18, 19 of the rotary face seal ring 11 and the sleeve 10.

A mass-contributing means creating a heavy mass that generates correspondingly large radial centrifugal forces when the sleeve 10 rotates is arranged in an annular groove 21 in the outer peripheral surface portion 19 of the sleeve 10. The annular groove 21 is covered by the inner peripheral surface 18 of the rotary face seal ring 11. It is preferred that the mass-contributing means be in the form of an articulated ring 22 as shown more particularly in FIG. 2. It is, however, possible to construct this component in other manners, e.g. in the form of a split ring-mass which engages with the inner peripheral surface 18 of the rotary face seal ring 11. The articulated ring 22 is seated in the groove 21 with free-play so as not to impede radial expansion of the articulated ring 22 under the influence of the centrifugal forces.

The areal center of gravity of the rotary face seal ring 11 is referenced S in FIG. 1, whilst that of the articulated ring is referenced s. The articulated ring 22 is located at an axial position of the outer peripheral surface portion 19 of the sleeve 10 which is such that an axial spacing A is maintained between the areal centers of gravity S and s in a direction opposite to the direction leading towards the sealing faces 6, 16.

As is shown in FIGS. 2 and 3, the articulated ring 22 includes a plurality of peripherally distributed individual masses M whose individual areal centers of gravity are axially spaced by the distance A from the areal center of gravity S of the rotary face seal ring 11. Adjacent individual masses M are flexibly connected to one another. To this end, there may be provided a respective flexible web 23 between each of the adjacent individual masses M, thereby enabling the individual masses to experience a limited relative radial movement therebetween. As is shown in FIG. 3, the webs 23 can be produced by making incisions 24 alternately from each end face of the articulated ring 22 whereby one web 23 close to one end face of the articulated ring 22 is followed by another such web close to the opposite end face thereof. As can also be appreciated from FIGS. 2 and 3, the periphery of the articulated ring 22 is split at a suitable peripheral position thereof by fully extending one of the incisions 24 from one end face of the articulated ring 22 to the opposite end face thereof, so as to form a gap 25.

As an alternative to an articulated ring 22, a plurality of individual masses could be provided, in a suitable manner, in recesses in the outer peripheral surface portion 19 of the sleeve 10 but without the provision of a peripheral connection between these individual masses. In addition, the effective mass of the individual masses need not be the same. Rather, peripherally distributed heavier individual masses could be off-set relative to lighter individual masses thereby creating centrifugal forces of differing magnitudes at a certain rotational speed.

Furthermore, provision may be made for either the outer periphery of the articulated ring 22 or that of the individual masses, or, the inner peripheral surface 18 of the rotary face seal ring 11 to be shaped, at the section whereat they can inter-engage, such that there will be an improved transfer of the centrifugal forces from the articulated ring 22 to the rotary face seal ring 11. For this purpose, the outer periphery of the rotary face seal ring 11 may, for example, comprise a radially projecting portion of reduced axial dimensions which forms a quasi annular collar through which engagement with the inner peripheral surface 18 of the rotary face seal ring 11 is effected. As an alternative, the outer peripheral surface portion 19 of the sleeve 10 near the articulated ring 22 could be provided with an annular recess so as to reduce the area of engagement between the peripheral surface 18 of the rotary face seal ring 11 and that of the articulated ring 22 and thereby produce improved force transfer ratios.

Materials having a large specific gravity are preferred for the articulated ring 22 or the individual masses because of the functions attributable thereto. Preference is given to a tungsten carbide or a steel material, although other materials could be utilized.

The manner in which the face seal device constructed as previously described functions is as follows. Due to the frictional heat (molecular friction) created in the sealing clearance between the sealing faces 6, 16 at high rotational speeds of the shaft 3 e.g. at rotational speeds of 10,000 min$^{-1}$ and more, and despite of a lack of contact, the rotary face seal ring 11 experiences a heating leading to a temperature gradient from the sealing face 16 to the opposite outer end face 15. The deformation of the rotary face seal ring 11 produced at high rotational speeds due to the thermally induced distortions manifests itself in the form of a corresponding alteration in the configuration of the sealing clearance whereby the sealing clearance between the seal faces 6, 16 is opened at an angle to form a wedge-shaped gap. The consequences of a sealing clearance being altered in this manner would be increased leakage. In accordance with the invention, this is countered by utilizing the centrifugal forces to which the articulated ring 22 or the individual masses are subjected at high rotational speeds so as to apply a radial force to the rotary face seal ring 11. This radial force exerts a torque through a lever arm A, thereby causing the face seal ring 11 to experience a rotation which is effective in the sense of a reduction in the opening angle of the sealing clearance so that the opening of the sealing clearance produced by the thermally induced distortion can be compensated. This compensating torque becomes larger, the higher the rotational speed and thus, the greater the thermal distortion. By appropriate selection of the articulated ring 22 or the individual masses and the spacing A between the areal centers of gravity S, s, the compensating effect produced by the torque resulting from the centrifugal force can be determined for a permissible range of rotational speeds and optimized for each face seal device, so that a full, or a virtually full compensation effect can be achieved for the thermally induced deviations from a desired configuration of the sealing clearance.

Experiments made with a face seal device in accordance with the invention having a nominal diameter of 130 min at a rotational speed of 15,000 min$^{-1}$, have shown that, at every pressure requiring sealing, and especially at pressures of over 200 bar, the leakage of a gaseous medium could be considerably reduced, i.e. reduced by more than half, through use of the teachings according to the invention, in comparison with a face seal device without such centrifugally induced compensation for the geometry of the sealing clearance.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A face seal device for use with a rotating component rotating at a high rotational speed, comprising:
    a non-rotating face seal ring;
    a rotary face seal ring mounted in a loose fit for common rotation with the rotating component, wherein said rotary face seal ring comprises a sealing face which, in operation, is essentially radially aligned for cooperation with an opposite sealing face of said non-rotating face seal ring; and
    a mass-contributing means arranged to rotate in common with the rotating component and engaging a portion of said rotary face seal ring, wherein a center of gravity of said mass-contributing means is axially spaced by a spacing from a center of gravity of said rotary face seal ring, whereby a torque directed towards said non-rotating face seal ring is exerted to said rotary face seal ring in correspondence with centrifugal forces resulting due to said mass-contributing means and the spacing between the centers of gravity.

2. The face seal device according to claim 1, wherein said mass-contributing means is provided in an annular groove-shaped recess in the rotating component, and wherein the recess is covered by an inner peripheral surface of said rotary face seal ring.

3. The face seal device according to claim 1, wherein said mass-contributing means comprises a plurality of peripherally distributed individual masses.

4. The face seal device according to claim 3, wherein articulations interconnect adjacent ones of said individual masses.

5. The face seal device according to claim 1, wherein said mass-contributing means comprises an articulated ring having connecting webs respectively between adjacent ones of a plurality of individual masses, and wherein the webs are arranged alternately near a front end face and near a back end face of said articulated ring.

6. The face seal device according to claim 1, wherein said mass-contributing means is made of materials comprising a steel material.

7. The face seal device according to claim 1, wherein said mass-contributing means is made of materials comprising a sintered material selected from a group of materials comprising WC.

8. The face seal device according to claim 1, wherein said rotary face seal ring is formed of a ceramic material selected from a group of materials comprising SiC.

9. The face seal device according to claim 1, wherein said rotary face seal ring is formed of a sintered material selected from a group of materials comprising WC.

10. A face seal device, comprising:
    a rotary component;
    a non-rotating face seal ring;
    a rotary face seal ring mounted to rotate with said rotary component, wherein said non-rotating face seal ring and said rotary face seal ring comprise respective, mutually confronting sealing faces; and
    a supplemental mass mounted to rotate with the rotary component and engaging a portion of said rotary face seal ring, wherein said supplemental mass and said rotary face seal ring have respective, mutually axially and radially offset centers of gravity, defining a spacing between the centers of gravity, and
    wherein said supplemental mass and the spacing between the centers of gravity are arranged to produce a torque on the sealing face of said rotary face seal that counteracts leakage of a pressurized, non-solid medium between the confronting sealing faces in a range of operational rotational speeds of said rotary component.

11. The face seal device according to claim 10, wherein the torque reduces the leakage of the medium by at least 50% at a median operational rotational speed of the rotary component.

12. The face seal device according to claim 10, wherein said supplemental mass is distributed about a circumference between said rotary component and said rotary face seal ring.

13. The face seal device according to claim 12, wherein said supplemental mass comprises a band recessed in a circumferential groove in said rotary component.

14. The face seal device according to claim 10, wherein said rotary face seal ring has an essentially rectangular cross-section between the sealing face and a back face of said rotary face seal ring.

15. A face seal device, comprising:
    a rotary component;
    a non-rotating face seal ring;
    a rotary face seal ring mounted to rotate with said rotary component, wherein said non-rotating face seal ring and said rotary face seal ring comprise respective, mutually confronting sealing faces; and
    a supplemental mass mounted to rotate with the rotary component and engaging a portion of said rotary face seal ring, wherein said supplemental mass and said rotary face seal ring have respective, mutually axially and radially offset centers of gravity, defining a spacing between the centers of gravity, and
    wherein said supplemental mass and the spacing between the centers of gravity are arranged to produce a torque that counteracts formation of a wedge-shaped sealing clearance between the confronting sealing faces in a range of operational rotational speeds of said rotary component.

* * * * *